United States Patent [19]

Capitant et al.

[11] Patent Number: 5,321,500
[45] Date of Patent: Jun. 14, 1994

[54] NON-REAL-TIME FILM SCANNING SYSTEM

[75] Inventors: Patrice J. Capitant, Los Altos; Vinson R. Perry, San Carlos; David O. Hodgson, San Mateo, all of Calif.

[73] Assignee: Sony Electronics Inc., Park Ridge, N.J.

[21] Appl. No.: 741,329

[22] Filed: Aug. 7, 1991

[51] Int. Cl.⁵ .............................................. H04N 3/36
[52] U.S. Cl. ................................... 348/97; 348/459
[58] Field of Search ................ 358/54, 214, 215, 102, 358/134, 487, 445; 358/487, 445; H04N 9/11, 3/36, 3/40

[56] References Cited

U.S. PATENT DOCUMENTS

| | | | |
|---|---|---|---|
| 4,096,523 | 6/1978 | Belmares-Sarabia et al. | 358/80 |
| 4,205,337 | 5/1980 | Millward | 358/54 |
| 4,223,343 | 9/1980 | Belmares-Sarabia et al. | 358/54 |
| 4,272,780 | 6/1981 | Belmares-Sarabia et al. | 358/54 |
| 4,338,634 | 7/1982 | Dillion et al. | 358/214 |
| 4,418,358 | 11/1983 | Poetsch et al. | 358/80 |
| 4,524,392 | 6/1985 | Poetsch | 358/214 |
| 4,639,787 | 1/1987 | Isogai | 358/214 |
| 4,786,979 | 11/1988 | Claus et al. | 358/335 |
| 4,903,132 | 2/1990 | Yamawaki | 358/134 |
| 5,014,133 | 5/1991 | Mumford | 358/41 |
| 5,084,755 | 1/1992 | Ozaki | 358/54 |

FOREIGN PATENT DOCUMENTS

| | | | |
|---|---|---|---|
| 0034615 | 3/1979 | Japan | 358/214 |
| 2221817 | 2/1990 | United Kingdom | H04N 3/40 |
| 2243264 | 10/1991 | United Kingdom | H04N 3/36 |

OTHER PUBLICATIONS

"Telecine—The State of the Manufacturers," 3 pages in length.
Brochure entitled "DaVinci Unified Color Correction System," Dynatech Broadcast Group Limited, printed Oct. 1987, 8 pages in length.

*Primary Examiner*—James J. Groody
*Assistant Examiner*—Chris Grant
*Attorney, Agent, or Firm*—Limbach & Limbach

[57] ABSTRACT

A film scanning system and method for generating a digital signal representing digitized film images, and having a first (less than real-time) film frame rate, and performing digital correction (such as flare correction, color correction, or both) on the digital signal at a higher (but still less than real-time) frame rate. In a preferred embodiment, conventional video signals (having NTSC or PAL format, or SMPTE-240M or another high definition video format) are then generated from the corrected digital signal. In one embodiment, the system of the invention includes circuitry for scanning color film frames to generate and store a digital signal (representing digitized color film images) at a rate of 1.875 film frames per second, circuitry for color correcting the stored digital signal at an internal processing rate of 7.5 frames per second, and means for generating SMPTE-240M high definition video signals (having a frame rate of 30 frames per second) from the color corrected digital signal.

19 Claims, 9 Drawing Sheets

NON-REAL-TIME FILM SCANNING SYSTEM

FIELD OF THE INVENTION

The invention is a non-real-time film scanning system and method for generating digitized color film images. More particularly, the non-real-time film scanning system of the invention includes a processor for generating digitized color film images from motion picture film at a slow rate, a processor for digitally color correcting the digitized images, and a processor for digitally generating video signals from the color corrected digitized images.

BACKGROUND OF THE INVENTION

Conventional motion picture film comprises frames that are commonly displayed sequentially at a frame rate of 24 frames per second (24 fps), or 30 fps, or some other rate. Required special effects may embodied in the displayed film.

Systems (including "telecine" systems) have been developed for converting motion picture film into video signals. These systems generate a video signal from motion picture film images by scanning the film frames sequentially to generate digitized film images. They then convert the digitized images into a video signal having a standard video frame rate (25 video frames per second for PAL video, 29.97 video frames per second for NTSC video, or 30 video frames per second for SMPTE-240M high definition video). Each video frame consists of two fields.

Conventional telecine systems are "real time" system in the sense that they generate a video signal from motion picture film images at a desired video frame rate (such as the standard PAL or NTSC video frame rate).

Due to the mismatch between the film frame rate (24 fps) and the PAL video frame rate (25 fps), motion picture film is often fed through a conventional PAL telecine system at the slightly elevated rate of 25 film frames per second, for the sake of processing convenience.

Due to the mismatch between the conventional film frame rate (24 fps) and the NTSC video frame rate (approximately 30 fps), a so-called "3-2 pulldown" (or "3-2-3-2 pulldown") technique is commonly employed to generate NTSC video using a telecine system. A version of such 3-2 pulldown technique will be described with reference to FIG. 7. Because the proposed SMPTE-240M standard for high definition digital video specifies a video frame rate of 30 frames per second, a 3-2 pulldown operation or its equivalent may also be useful to generate SMPTE-240M video using a telecine system.

The "real time" nature of conventional telecine systems gives rise to a number of disadvantages. Such systems can have a tendency to damage or break the film being processed due to the high speed at which the film is translated through the scanner and the way the film is handled. Also, the high processing rate of conventional telecine systems could require expensive and complicated circuitry for digitizing the scanned data with more than eight-bit quantization.

Until the present invention, no system has been developed for generating digitized color film images from motion picture film at a slow (less than real-time) rate, digitally correcting the digitized images at the same slow rate (or at a different slow rate), and digitally generating a video signal (having a standard frame rate) from the digitized images.

Throughout the specification, including in the claims, the phrase "slow rate" will be used to denote a less than real-time frame rate. For example, the invention may scan motion picture film (of the type that is normally displayed at a real-time rate of 24 fps) at a "slow rate" of 1.5 fps or 1.875 fps, and digitally perform color correction on the scanned data at another "slow rate" of 6.0 fps or 7.5 fps.

Also throughout the specification, including in the claims, the phrase "standard frame rate" will be used to denote a real-time frame rate. For example, the proposed standard frame rate of an SMPTE-240M digital video signal is 30 frames per second, and the standard frame rate of conventional motion picture film is 24 frames per second

SUMMARY OF THE INVENTION

The invention is a non-real-time film scanning system and method for generating digitized color film images at a first (less than real-time) frame rate, and performing digital correction operations (such as flare correction, color correction, or both) on the digitized images at a higher (but still less than real-time) frame rate. In a preferred embodiment, conventional video signals (having NTSC, PAL, or SMPTE-240M format, or a future standard high definition video format) are then generated from the corrected digitized images.

In one embodiment, the system of the invention includes circuitry for scanning color film frames to generate and store a digital signal (representing digitized color film images) at a rate of 1.875 film frames per second, circuitry for color correcting the stored digital signal at an internal processing rate of 7.5 frames per second, and means for generating high definition video signals (having a frame rate of 30 frames per second) from the color corrected digital signal.

DETAILED DESCRIPTION OF THE PREFERRED EMBODIMENT

The apparatus of the invention can be embodied in the apparatus disclosed in each of the following patent applications, each assigned to the assignee of the present application: "Method and Apparatus for Flare Correction," by D. Hodgson and Y. Levy, filed Aug. 19, 1991 (Ser. No. 07/746,928) "Digital Color Correction System and Method," by P. Capitant, V. Perry, and K.

Swamy, filed Jun. 5, 1991 (Ser. No. 07/710,704); "Digital Video Color Processor with Anti-Alias Filter," by D. Hodgson, filed Aug. 5, 1991 (Ser. No. 07/740,623); "Film-to-Video Frame Image Conversion Apparatus and Method for Selectively Identifying Video Fields and Frames," by P. Capitant, D. Hodgson and V. Perry, filed May 14, 1991 (Ser. No. 07/699,928); "Digitized Film Image Processing System with Bordered Split Screen Display," by P. Capitant, D. Hodgson, and V. Perry, filed Aug. 5, 1991 (Ser. No. 07/740,626); and "Digital Video Processing System with Mixer Prefilter," by D. Hodgson, Jul. 25, 1991 (Ser. No. 07/736,006). The specification of each listed application is incorporated herein by reference.

We contemplate that the invention may be embodied in a film scanning and processing system of the type shown in FIGS. 1-9. The system of FIG. 1 includes film scanner 10 and camera processor 12. Film scanner 10 transports motion picture film (color or black and white) past camera processor 12, which includes a video camera and related analog video signal processing circuitry. Camera processor 12 images each film frame adjacent to it, and generates an analog signal representing each film frame.

Figure 1:
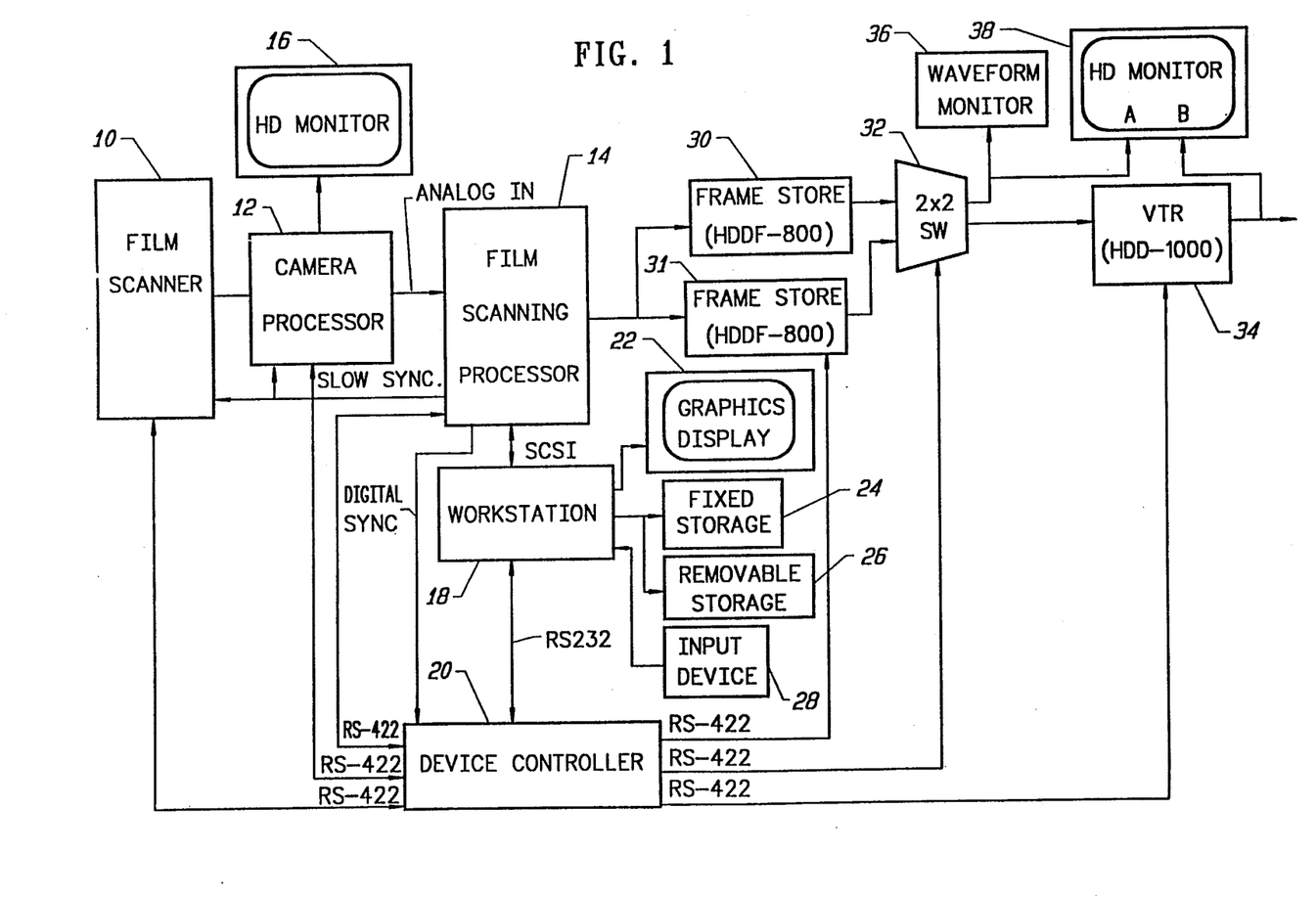
FIG. 1 is a block diagram of a film to video conversion system, in which the invention may be embodied.

In a preferred embodiment, the motion picture film is imaged by camera processor 12 at a rate of 1.875 frames per second ("1.875 fps"), as scanner 10 transports the film past camera processor 12 at that rate (1.875 fps). Camera processor 12 preferably generates analog high definition video signals, such as analog high definition video signals having SMPTE-240M format.

The analog output of camera processor 12 is supplied to film scanning processor 14, and is optionally also displayed on monitor 16. Within film scanning processor 14, the analog video signals from camera processor 12 are digitized, and various digital signal processing operations (to be discussed in detail below with reference to FIGS. 2-6) are performed digitally on the digitized video data. Color correction will typically also be performed by circuitry (to be discussed in detail below with reference to FIG. 6) within processor 14. Flare correction is also performed, preferably digitally, by circuitry within processor 14.

Computer 18 interfaces with, and controls processor 14 and device controller 20. In response to user commands sent from computer input device 28 to computer 18, computer 18 instructs processor 14 to perform signal processing operations selected by the user, and computer 18 instructs controller 20 to send user-selected control signals to processor 12, scanner 10, frame storage units 30 and 31, 2×2 switch 32, and video recording and playback unit 34.

In a preferred embodiment, computer 18 is a workstation (such as a NEWS 1850 workstation, available from Sony Corporation) connected by an SCSI interface to processor 14, computer 18 is connected 12, scanner 10, frame storage units 30 and 31, switch 32, and video recording and playback unit 34. In one preferred embodiment, units 30 and 31 are Model HDDF-500 high definition video frame store units available from Sony Corporation, and recording and playback unit 34 is a Model HDD-1000 high definition video recorder available from Sony Corporation.

Also connected to computer 18 are fixed data storage means 24 (which may be a hard disk drive) and removable data storage means 26 (which may be a floppy disk drive), and graphics display 22 (preferably, a high resolution color graphics display).

Preferably, computer input device 28 includes a touch tablet for finger selection of menu items and icons displayed on monitor 22, a trackball for selecting color and image areas displayed on monitor 22, and a keyboard for entering text, user notes, and processing parameters.

After the digitized video data are processed digitally in processor 14, the processed data are stored on a frame-by-frame basis in frame stores 30 and 31. Switch 32, under control of controller 20, connects desired ones of frame stores 30 and 31 to video recording and playback unit 34 and to waveform monitor 36 and video monitor 38 (which is preferably a high definition video monitor). To maximize the system's throughput rate, as a frame of data is read out (or multiple frames of data are read out) from one of frame stores 30 and 31, the next frame (or frames) of data should simultaneously be written into the other one of frame stores 30 and 31. In such an operating mode, switch 32 connects alternating ones of frame stores 30 and 31 to unit 34 (and optionally also to monitors 36 and 38).

Figure 2:
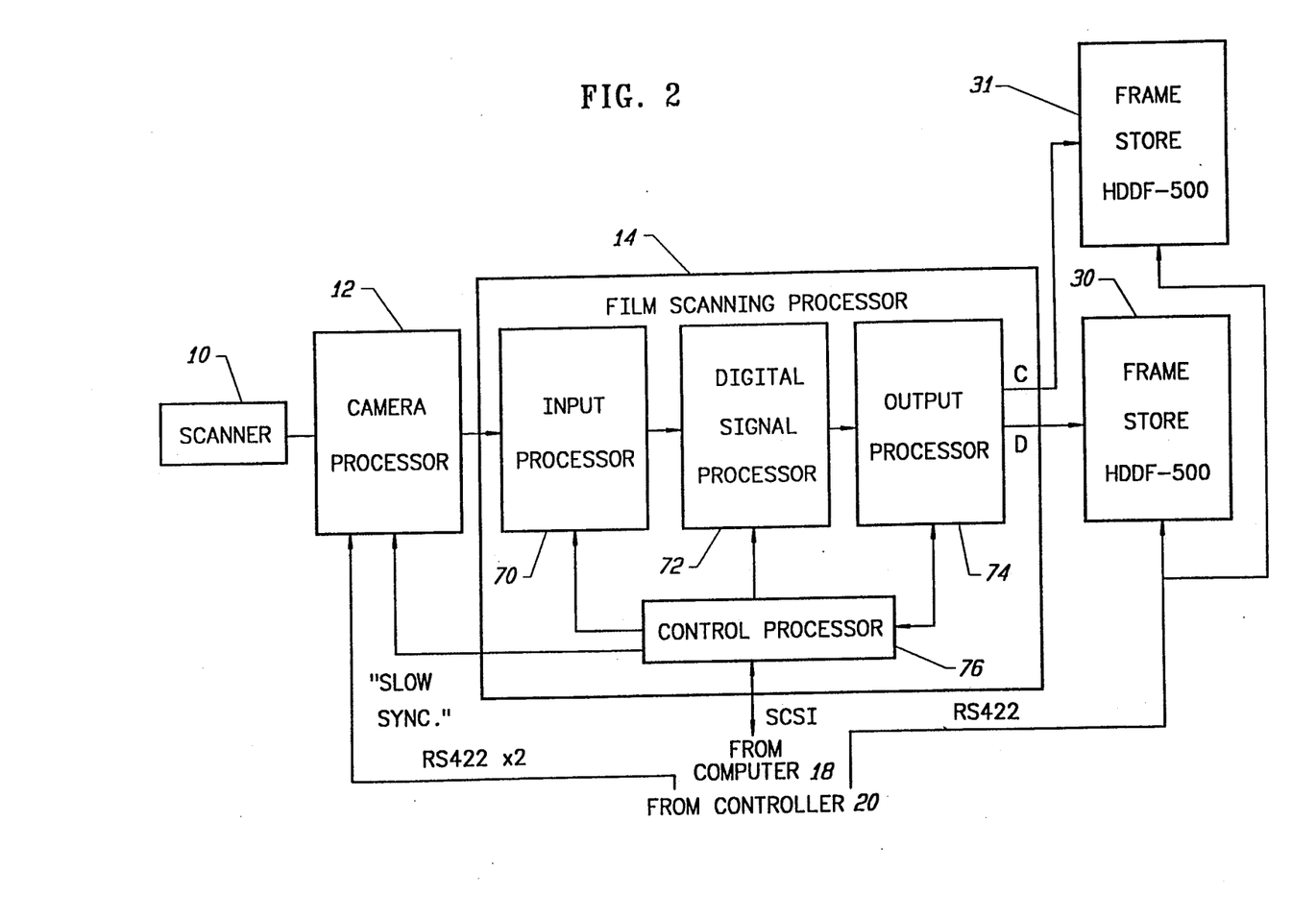
FIG. 2 is a block diagram of a portion of the FIG. 1 system.

The preferred embodiment of film scanning processor 14 shown in FIG. 2 includes input processor 70 (which receives the analog output of camera processor 70), digital signal processor 72, output processor 74, and control processor 76. Input processor 70 digitizes the analog input signal, performs preliminary corrections on the resulting digitized data, and supplies the preliminarily processed digitized data to digital signal processor 72 for color correction. The color corrected data generated in processor 72 are supplied through output processor 74 to frame stores 30 and 31. Processors 70, 72, and 74 operate under control of control processor 76, which in turn receives instructions from computer 18 over an SCSI interface.

In one class of embodiments, control processor 76 generates a synchronization signal for reading out (discharging) an image sensor means within camera processor 12. Preferably, the image sensor means is read out at a low rate (such as 1.875 fps) in response to a correspondingly low rate synchronization signal ("slow sync") from processor 76.

Figure 3:
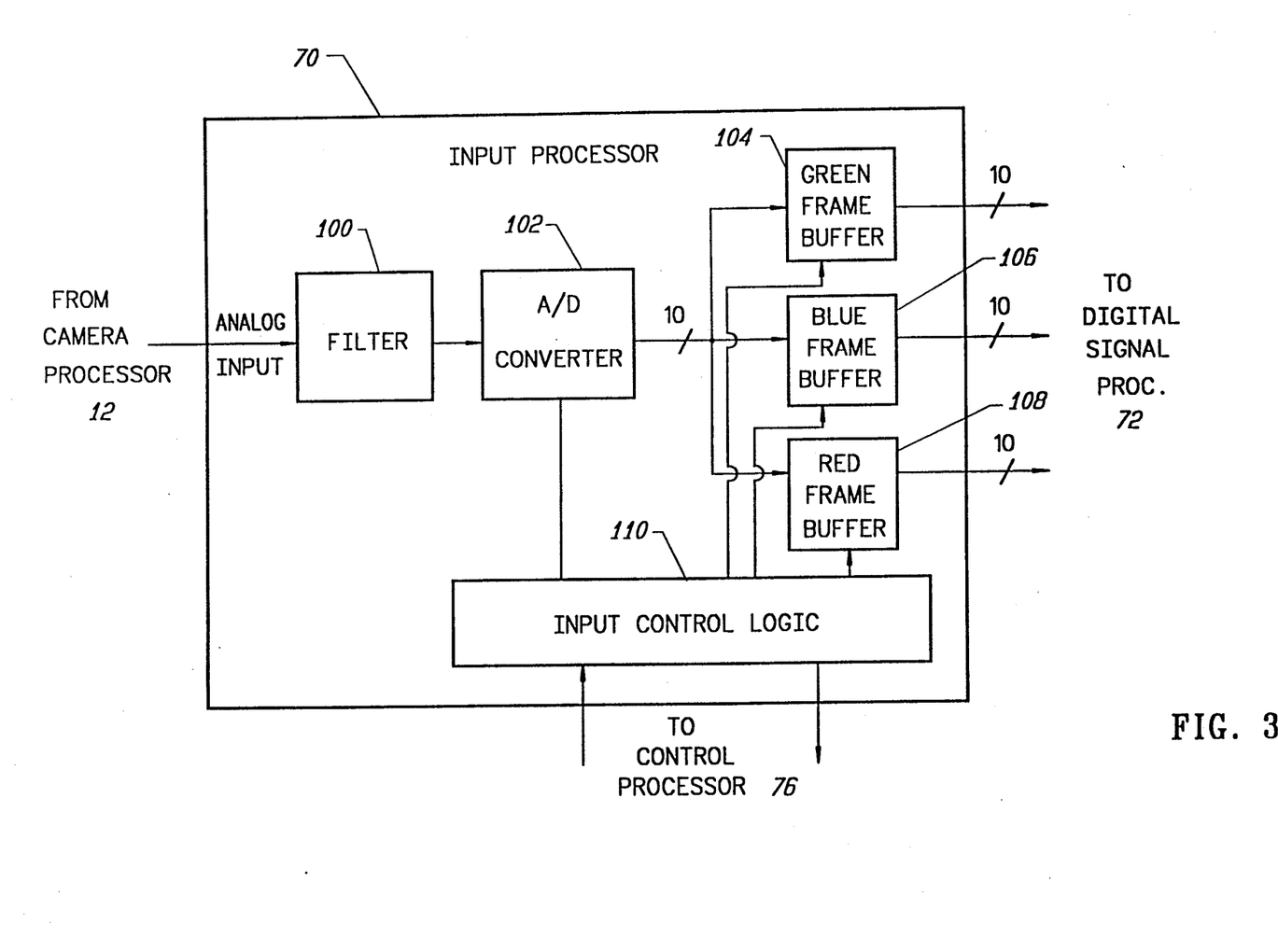
FIG. 3 is a block diagram of the input processor shown in FIG. 2.

A preferred embodiment of input processor 70 is shown in FIG. 3. The analog input signal supplied to processor 70 consists of frames, each comprising 2200×1125 pixels. There are 2200 pixels per line, including 1920 active video pixels, and 280 pixels which comprise the horizontal blanking interval. Each frame consists of 1125 lines, including lines comprising an even field and an odd field, and ninety lines comprising a vertical blanking interval. The vertical blanking intervals contain synchronization information.

The analog input signal is supplied from camera processor 12 (preferably over a 75 ohm coax cable) to filter/amplifier circuit 100. Circuit 100 includes an amplifier for amplifying the analog input signal, circuitry for separating the sync and video portions of the input signal, and a low pass filter for filtering the video portion of the input signal to enhance resolution during digitization. In one embodiment, the cutoff frequency of the low pass filter within circuit 100 is about 7.5 MHz, with the filter having a flat frequency response from 0 to 7.5 MHz, and the frequency response of the filter declining in a steep slope from 7.5 MHz to 9.3 MHz.

The amplified, low-pass-filtered analog output from filter 100 is digitized in analog-to-digital conversion circuit 102. In a preferred embodiment, circuit 102 implements 10-bit quantization, in which case the digital data generated by circuit 102 will comprise ten parallel digital data streams. In order to perform 10-bit quantization with relatively simple, inexpensive analog-to-digital conversion circuitry 102, we prefer that the output frame rate of camera processor 12 should equal 1.875 fps. When the output frame rate of camera processor 12 is 1.875 fps, the digital data emerging from circuit 102 has a data rate of 18.56 MHz (one fourth the proposed real-time SMPTE-240M high definition video clock rate, 74.25 MHz).

The digital video data generated by A/D converter 102 are supplied to green frame buffer 104, blue frame buffer 106, and red frame buffer 108. The output of camera processor 12 is time division multiplexed, typically in the following sequence: two fields of blue data, then two fields of green data, then two fields of red data, and finally two fields of gray data. Input control logic circuitry 110 (operating under control of control processor 76) causes frames of blue digital data ("$B_{in}$"), green digital data ("$G_{in}$"), and red digital data ("$R_{in}$") from A-to-D converter 102 to be written sequentially (on a frame-by-frame basis) into buffer 106, then into buffer 104, and next into buffer 108. The gray frames are not normally written into any of buffers 104, 106, and 108.

Blue, green, and red data are written sequentially into buffers 104, 106, and 108 at the source rate (typically, 1.875 frames per second). Blue, green, and red data are read out in parallel from buffers 104, 106, and 108 (to produce three parallel data streams, each representing a different 10-bit color channel) at four times the source rate. Thus, each color channel output from buffers 104, 106, and 108 typically has a frame rate of 7.5 frames per second (one fourth of the proposed standard SMPTE-240M digital video frame rate). In order to achieve the described four-fold increase in frame rate, each bit written into one of buffers 104, 106, and 108, is read out four times from that buffer.

Preferably, each of buffers 104, 106, and 108 is a double buffer, including a first memory, and a second memory into which data can be written while data (previously written into the first memory) is read from the first memory.

As mentioned, the gray frames are not normally written into any of buffers 104, 106, and 108. However, in one class of embodiments, the system has an optional operating mode in which gray frames are read from input processor 70 at four times the source rate at which they are supplied to processor 70. In one such embodiment, a double gray frame buffer is connected in parallel with buffers 104, 106, and 108. One memory within the double gray frame buffer is filled while the other memory therein is read (at four times the source rate) to processor 72. In another of such embodiments, the gray frames (rather than the red, green, and blue frames) are read into one or more of buffers 104, 106, and 108.

Figure 4:
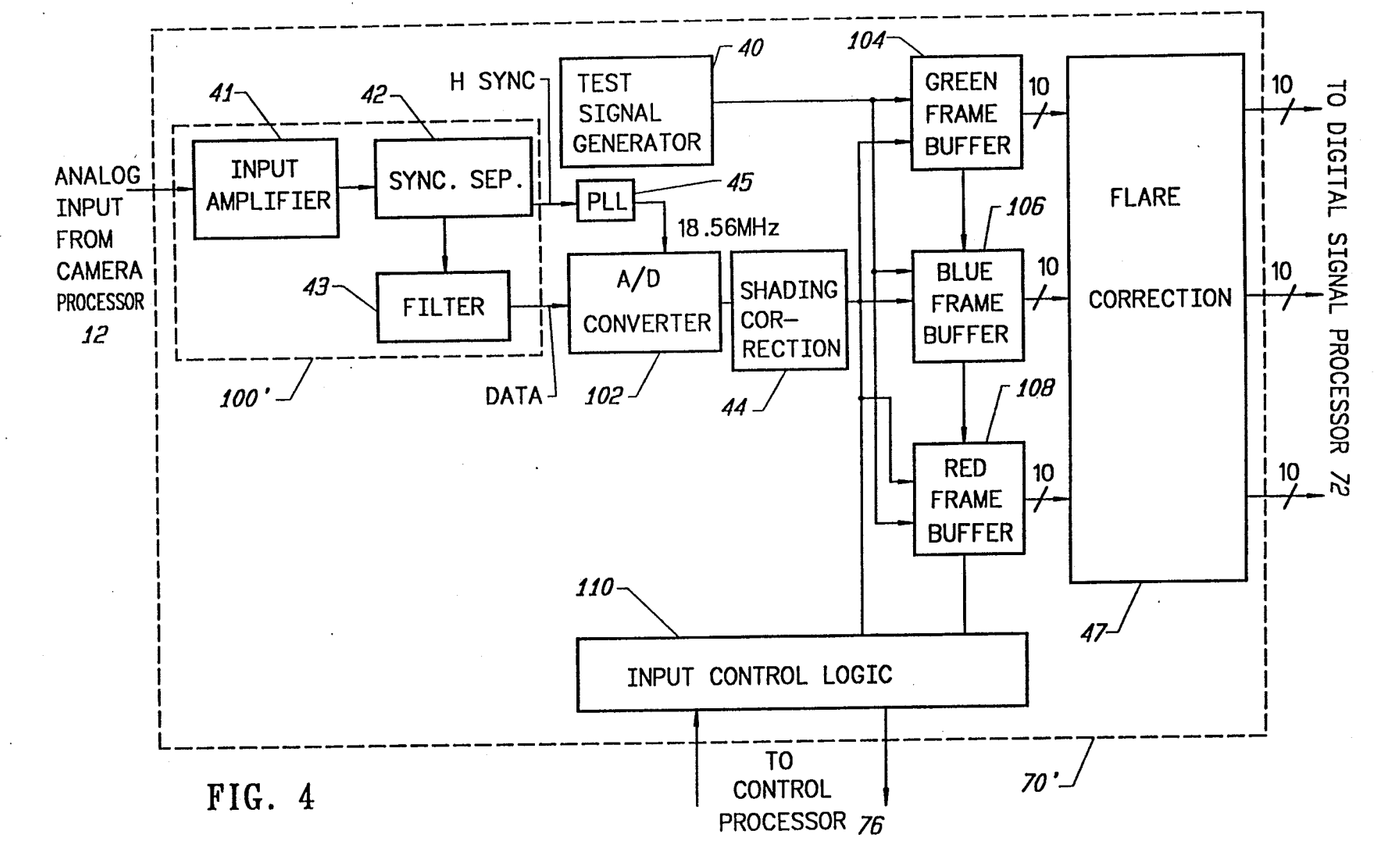
FIG. 4 is a block diagram of an alternative preferred embodiment of the input processor shown in FIG. 2.

In the embodiment of FIG. 4, input processor 70' includes means for performing shading correction on the digital output of A-to-D converter 102. The shading correction is performed (by circuit 44) before flare correction is performed (by circuit 47) on the data. In order to perform shading correction, a set of black and white shading correction signals must be generated. In contrast with flare correction signals which compensate for undesired luminance variation due to optical scatter from frame to frame within each color channel, the shading correction signals compensate for undesired luminance variation within each frame due to CCD pattern noise.

The black shading correction signals are preferably generated in the following manner. Camera processor 12 and input processor 70' (or input processor 70 of FIG. 2) are operated to generate red, green, and blue digital data collectively representing a "black" motion picture frame. This is conveniently accomplished by positioning a lens cap over the lens of the camera within unit 12, and then operating unit 12 to generate a red frame of data, a green frame of data, and a blue frame of data. The average luminance of each frame is then computed in circuit 44. Then, for each frame, circuit 44 computes the difference between the luminance of each pixel of the frame, and the frame's average luminance. These difference signals (scaled by a pre-selected constant factor) are employed as "red," "green," and "blue" black shading correction signals (which are added to the corresponding red, green, and blue frames of data).

White shading correction is performed in a similar manner to black shading correction, except that the white shading correction signals generated are employed as multiplicative factor signals (rather than additive correction signals) to correct the red, green, and blue data streams.

In one class of embodiments, each of frame buffers 104, 106, and 108 includes two memory blocks, each having 1M×12 bit capacity. Each 1M×12 bit block includes three commercially available 1M×4 bit memory circuits. However, in a preferred embodiment within this class, only the ten most significant bits of the data are utilized (in the sense that each pixel read from any of buffers 104, 106, and 108, consists of ten parallel bits).

A preferred embodiment of an input processor which includes flare correction, shading correction, and lift variation correction circuitry will next be described with reference to FIG. 4. Input processor 70' of FIG. 4 is identical to input processor 70 of FIG. 3 except in the following respects. The analog input signal is supplied from camera processor 12 (preferably over a 75 ohm coax cable) to filter/amplifier circuit 100'. Circuit 100' includes input amplifier 41, sync separation circuit 42 for separating the horizontal sync, vertical sync, and video data portions of the input signal, and low pass filter 43 for filtering the video data portion of the input signal to reduce aliasing. In one embodiment, the cutoff frequency of low pass filter 43 is about 7.5 MHz, with the filter having a flat frequency response from 0 to 7.5 MHz, and the frequency response of the filter declining in a steep slope from 7.5 MHz to 9.3 MHz.

The amplified, low-pass-filtered analog data stream output from filter 43 is digitized in analog-to-digital conversion circuit 102. In a preferred embodiment, the H Sync signal from sync separation circuit 42 is multiplied by 2200 in phase-locked loop 45 to generate an 18.56 MHz clock signal, and this 18.56 MHz clock signal is supplied to A-to-D conversion circuit 102, wherein it is employed to sample the input analog data at a data rate of 18.56 MHz.

In one operating mode, the digital video data generated by A-to-D converter 102 are supplied directly to green frame buffer 104, blue frame buffer 106, and red frame buffer 108 at the source rate (typically, 1.875 frames per second). Blue, green, and red data are read out in parallel from buffers 104, 106, and 108 (to produce three parallel data streams, each representing a different 10-bit color channel) at four times the source rate. In order to achieve the described four-fold increase in frame rate, each bit written into one of buffers 104, 106, and 108, is read out four times from that buffer.

In the normal operating mode, the digital data from A-to-D converter 102 are supplied to circuit 44, for shading correction and lift correction. The corrected red, green, and blue frames output from circuit 44 are written sequentially into frame buffers 104, 106, and 108. The data streams that are read out from frame buffers 104, 106, and 108 undergo flare correction in circuit 47.

In a third operating mode of input processor 70', data from test signal generator 40 (rather than A-to-D converter 102 or correction circuit 44) are written sequentially into frame buffers 104, 106, and 108.

Figure 5:
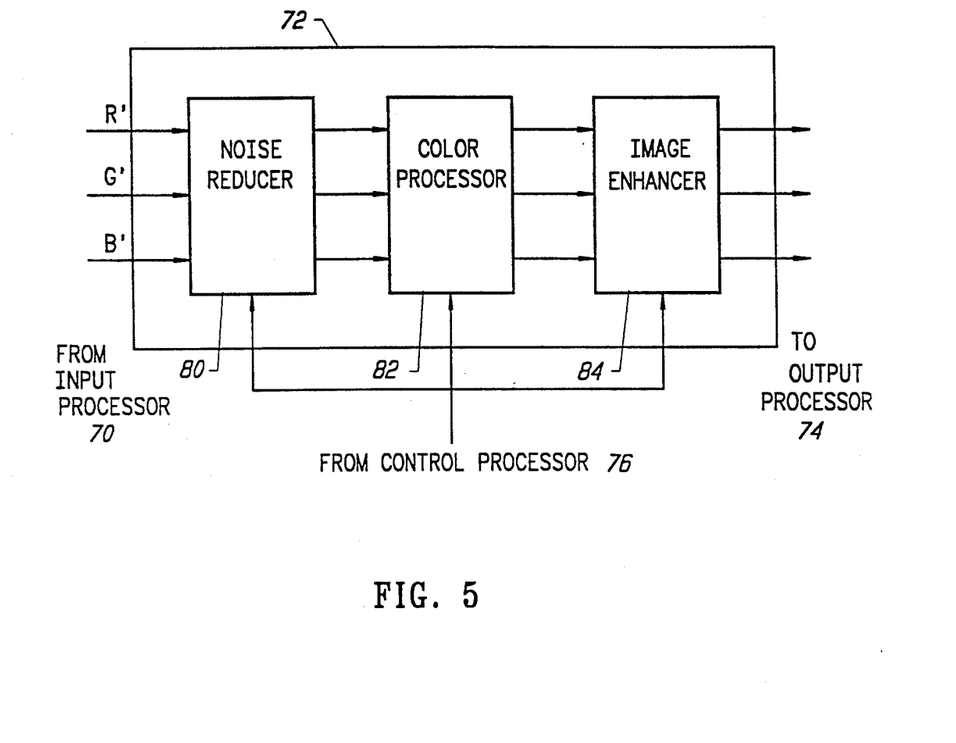
FIG. 5 is block diagram of the digital signal processor shown in FIG. 2.

With reference next to FIG. 5, digital signal processor 72 of FIG. 2 preferably includes a noise reduction circuit 80, which receives the data streams supplied, through frame buffers 104, 106, and 108, from input processor 70 of FIG. 3 (or input processor 70' of FIG. 4). Noise reduction circuit 80 should include a circuit for reducing film noise (including film grain noise and scratches) and image pick-up system noise (including noise relating to the system's optics and image sensor, as well as associated electronic noise).

As indicated in FIG. 5, the output of noise reduction circuit 80 undergoes digital color correction in color processor 82, and then digital image enhancement in image enhancement circuit 84. Preferably, digital signal processor 72 processes the digital data at an internal processing rate substantially greater than the scanning rate of camera processor 12. For example, if the scanning rate is 1.875 fps, the internal processing rate of processor 72 may desirably be 7.5 fps.

Figure 6:
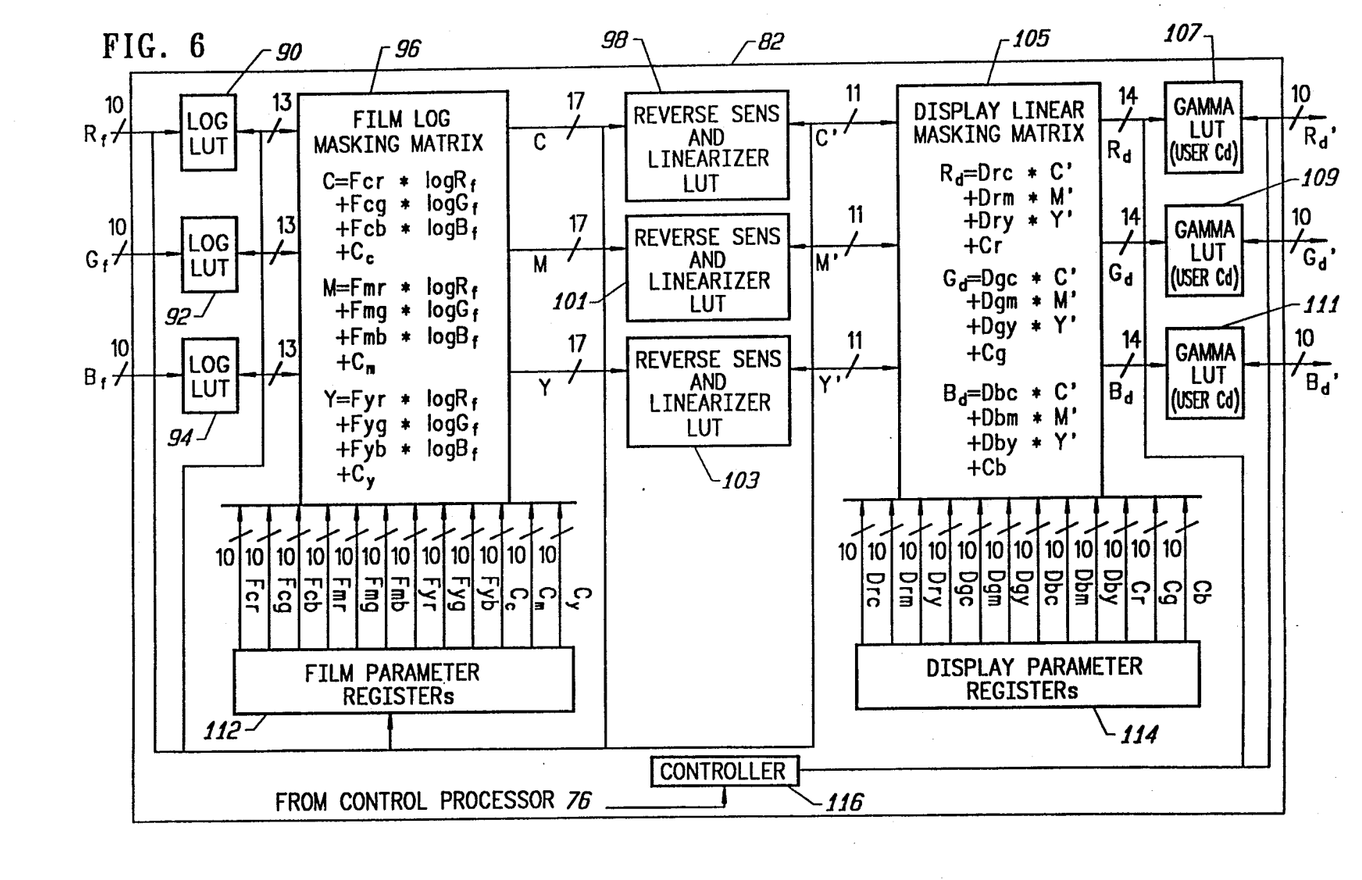
FIG. 6 is block diagram of the color processor shown in FIG. 5.

FIG. 6 is a preferred embodiment of color processor 82. The FIG. 6 apparatus is designed to perform a limited type of color transformation, namely the transformation of the colors of the digitized images generated by camera processor 12 (as a result of scanning motion picture film) into colors that would have been generated if the subject had been imaged directly by a video camera (i.e., without intermediate filming and film scanning steps). If desired, a more complicated and versatile color correction means, for example a "paint" system having the capability to perform a wide range of color transformations, may be substituted for the apparatus of FIG. 6.

The FIG. 6 apparatus includes a film transform section and a display transform section. The film transform section includes logarithm look-up tables 90, 92, and 94, masking matrix 96, parameter registers 112, and "reverse sensitometry and linearizing" look-up tables 98, 101, and 103. Display transform section includes masking matrix 105, parameter registers 114, and gamma function multiplication means 107, 109, and 111.

A logarithm operator is applied to each of the red, green, and blue 10-bit input pixels in look-up tables 90, 92, and 94, to generate a 13-bit value for each 10-bit input pixel. More particularly, logarithm look-up tables 90, 92, and 94 compute the logarithms of the red, green, and blue input pixels, by multiplying them by pre-stored log transformation parameters to generate 13-bit log domain output data.

Masking matrix 96 transforms the log domain data asserted at the outputs of look-up tables 90, 92, and 94 to correct for crosstalk between film dyes, interlayer interimage effects, and the effects of colored coupler masking as seen by camera processor 12. Masking matrix coefficients $F_{cr}$, $F_{cg}$, $F_{cb}$, $F_{mr}$, $F_{mg}$, $F_{mb}$, $F_{yr}$, $F_{yg}$, and $F_{yb}$, and parameters $C_c$, $C_m$, and $C_y$, are determined by the spectral absorption of the film dyes and the spectral sensitivity of camera processor 12's image pickup system, and are stored in registers 112 in response to control signals supplied from controller 116 (in response to control signals from control processor 76). The data pixels asserted at the outputs of masking matrix 96 are proportional to equivalent cyan, magenta, and yellow film densities, and hence are grouped into the channels labeled "C", "M", and "Y".

The equivalent dye densities are related in a well-known manner to selective film exposures by sensitometric and characteristic curves. For this reason, the "cyan" data generated in masking matrix 96 undergoes gamma correction and reverse sensitometry processing, as well as inverse-log transformation in look-up table 98. Similarly, the "magenta" data generated in masking matrix 96 undergoes gamma correction, reverse sensitometry, and inverse-log transformation in look-up table 101, and the "yellow" data generated in masking matrix 96 undergoes gamma correction, reverse sensitometry, and inverse-log transformation in look-up table 103.

Display section linear masking matrix 105 next transforms the linear domain data asserted at the outputs of look-up tables 98, 101, and 103 to compensate for the overall non-ideal spectral characteristics of the system as a whole (including the motion picture film being scanned, camera processor 12, and monitor 38). The masking matrix coefficients $D_{rc}$, $D_{rm}$, $D_{ry}$, $D_{gc}$, $D_{gm}$, $D_{gy}$, $D_{bc}$, $D_{bm}$, and $D_{by}$, and parameters $C_r$, $C_g$, and $C_b$, that are employed to process the CMY data pixels in display linear masking matrix 105 are stored in parameter registers 114.

Masking matrix coefficients $D_{rc}$, $D_{rm}$, $D_{ry}$, $D_{gc}$, $D_{gm}$, $D_{gy}$, $D_{bc}$, $D_{bm}$, $D_{by}$, $F_{cr}$, $F_{cg}$, $F_{cb}$, $F_{mr}$, $F_{mg}$, $F_{mb}$, $F_{yr}$, $F_{yg}$, and $F_{yb}$, and parameters $C_r$, $C_g$, $C_b$, $C_c$, $C_m$, and $C_y$ are preferably selected by the user in the following manner. A test frame, from a sample of motion picture film of the same type as the film to be color-corrected, is scanned. Output processor 74 generates a composite video signal (in a manner to be explained in greater detail below) by combining portions of the test frame and a comparable reference frame. Monitor 38 displays the composite signal as a split screen image (with complementary portions of the test frame and the reference frame in distinct regions of the split screen). To generate the composite signal, control processor 76 reads out the reference frame from one of frame stores 120–127 (of FIG. 7) under the control of computer 18.

While viewing the test frame and the reference frame, the user selects the processing coefficients and parameters interactively (by entering commands to input device 28 in response to menus displayed on computer graphics monitor 22) to achieve a desired visual appearance of the two displayed images.

In a variation on this procedure, the user selects a set of processing coefficients and parameters for each of a number of selected motion picture film frames (preferably using different corresponding pre-stored reference frames for each selected motion picture film frame), and computer 18 downloads each selected set of coefficients and parameters through control processor 76 and controller 116 at appropriate times to registers 112 and 114. Computer 18 also automatically generates coefficients and parameters for intermediate film frames (i.e., film frames for which the user did not specifically select coefficients and parameters) by employing an interpolation technique, and downloads these interpolated coefficients and parameters (at appropriate times) to registers 112 and 114.

After the data pixels asserted at the outputs of look-up tables 98, 101, and 103, are processed in display linear masking matrix 105, they are proportional to red, green, blue HDVS high definition video pixels and hence are grouped into the channels labeled "$R_d$", "$G_d$", and "$B_d$". Each of the $R_d$, $G_d$, and $B_d$ data streams is processed in a corresponding one of gamma function multiplication circuits 107, 109, and 111, to compensate for the nonlinear characteristics of the display monitor. In one class of embodiments, each of multiplication circuits 107, 109, and 111 is implemented as a single look-up table comprising a read-only memory which stores a set of transform parameters to be applied to all input pixels in the relevant RGB channel.

However, an implementation employing a single look-up table for each RGB channel may undesirably introduce aliased data components into the data which cannot practically be subsequently removed.

Accordingly, we prefer to implement each of multiplication circuits 107, 109, and 111 as a set of N parallel look-up tables (each for applying a different term of an N-degree polynomial to the data) with a low-pass filter for pre-filtering the input data supplied to each look-up table. In this preferred embodiment, the data supplied to each look-up table are pre-filtered in the corresponding filter to eliminate high frequency components of the data which would otherwise introduce aliased signal components into the output of the look-up table. Within each color channel, each low-band-pass filter preferably passes a different frequency band, with the cut-off frequencies for the filters corresponding to higher-order polynomial terms exceeding the cut-off frequencies for the filters for lower-order polynomial terms.

The output of color processor 82 preferably undergoes image enhancement in image enhancement circuit 84 (shown in FIG. 5) prior to subsequent processing in output processor 74. Image enhancement means 84 preferably performs both edge enhancement and softening. In alternative versions of digital signal processor 72 shown in FIG. 5, noise reduction means 80 or image enhancement means 84 (or both means 80 and means 84) are omitted.

Figure 7:
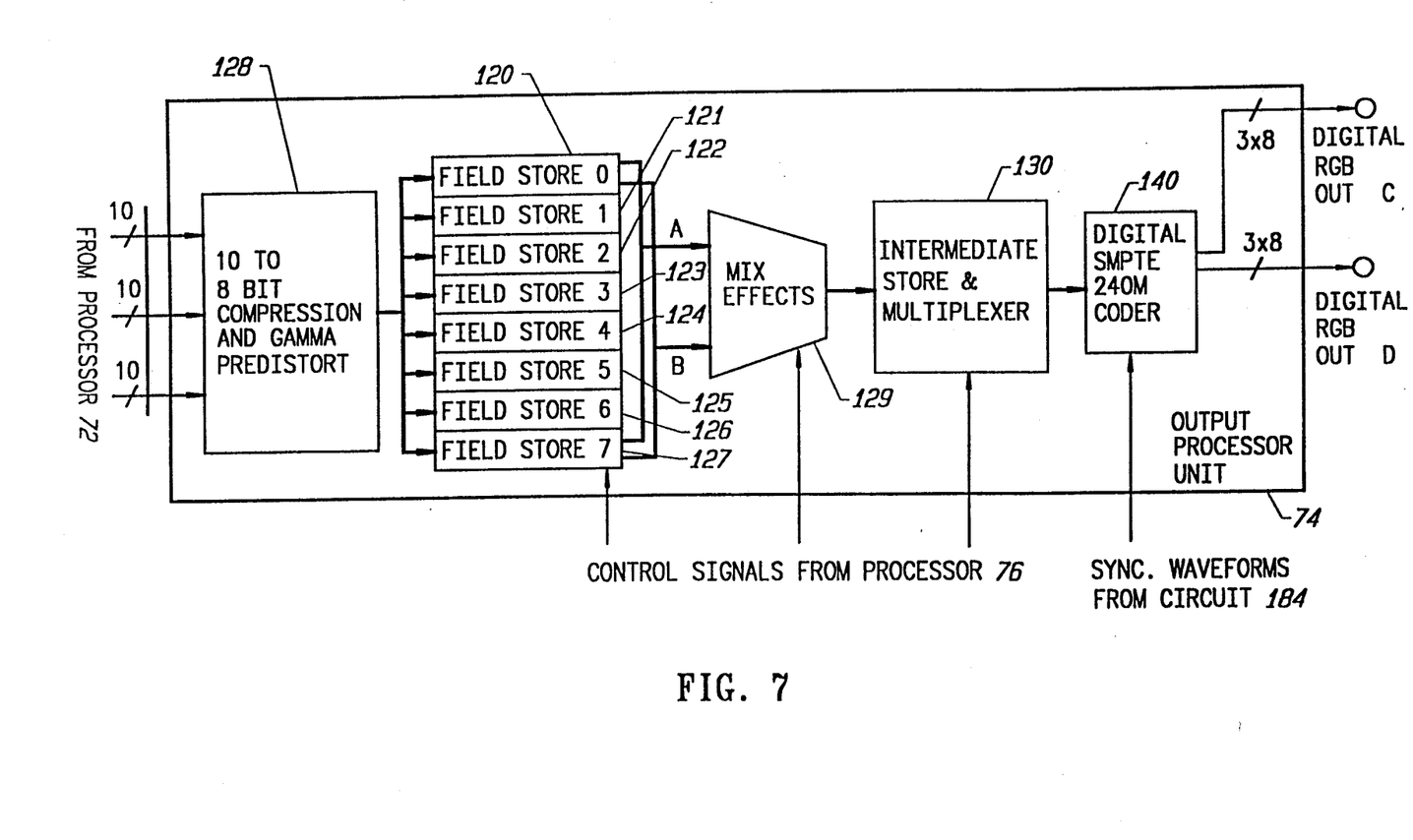
FIG. 7 is block diagram of the output processor shown in FIG. 2.

The preferred embodiment of output processor 74 shown in FIG. 7 includes compression circuit 128, which receives digitized frames of 10-bit parallel data from digital signal processor 72, and compresses the 10-bit parallel data stream into an 8-bit parallel data stream. The 8-bit data stream is written into a selected sequence of assembly field stores 120-127 in response to control signals supplied from control processor 76 to the field stores 120-127 (only one of field stores 120-127 receives data at a time). One or more digitized reference fields (typically, two reference fields which comprising a reference frame) are also stored in selected ones of field stores 120-127.

Five of field stores 120-127 are required to perform the 3-2 pulldown scanning process to be described below. Typically, two of field stores 120-127 are employed to store reference fields which comprise a reference frame.

Compression circuit 128 optionally also includes circuitry for performing display gamma predistortion on the 8-bit parallel data before the data are written into field stores 120-127.

As indicated in FIG. 7, data may be read from any two of field stores 120-127 in parallel, to produce two 8-bit parallel digital data streams A and B (for each color channel). In one typical case, data stream A represents a color-corrected motion picture film frame from digital signal processor 72, and data stream B represents a reference video frame prestored in the field stores.

Data are written into (and read out from) field stores 120-127 in response to control signals from processor 76. In one embodiment, a 3-2 pulldown process is implemented to write data from the field stores. Such a 3-2 pulldown process typically contemplates that camera processor 12 scans a motion picture film at a frame rate of (24/N) fps, where N is an integer, as the film advances through scanner 10 at the same rate (24/N fps). In one embodiment, N=16, so that camera processor 12 generates video frames at a rate of 1.5 frames per second. In this embodiment, digital data are read from input processor frame stores 104, 106, and 108 at the rate of 6 frames per second (12 fields per second), and written into field stores 120-127 at the same rate (12 fields per second).

Circuit 128 includes means for demultiplexing each frame of data it receives into its constituent odd $f_O$ and even $f_E$ fields, so that individual even or odd fields can be selectively written into fields stores 120-127. In general, to implement the 3-2 pulldown process, individual fields are written sequentially into field stores 120-127, and different sequences of fields (including some duplicate odd $f_{OD}$ and even $f_{ED}$ fields) are read from the field stores (at a higher field rate) to produce frames of output video data. Each frame of output video data includes one odd $f_O$ and one even $f_E$ field. In one embodiment, fields are written into field stores 120-127 at the rate of 12 fields per second, and are read out from fields stores 120-127 at the rate of 15 fields per second.

For example, in response to control signals from processor 76, fields can be written from circuit 128 into selected ones of field stores 120-127 in the following sequence: during a first timing cycle, fields $F_1f_O$ and $F_1f_E$ of the first input frame $F_1$, are written into field stores 120 and 121, respectively. During the next timing cycle, the two fields comprising the second input frame $F_2$ are written into field stores 122 and 123, respectively. Similarly, during subsequent timing cycles, subsequent input frames $F_N$ are written into selected pairs of field stores 120-124, or reference fields are written into field stores 125-126.

During the first output timing cycle, fields $F_1f_O$ and $F_1f_E$ corresponding to the first input frame $F_1$ are read from field stores 120 and 121. During the second output timing cycle, the odd field from the first input frame is output again as a duplicate field $F_1f_{OD}$, along with the even field $F_2f_E$ of the second input frame $F_2$. Subsequent fields are similarly output (for example, in the sequence described in detail in the above-referenced patent application entitled "Film-to-Video Frame Image Conversion Apparatus and Method for Selectively Identifying Video Fields and Frames," by P. Capitant, D. Hodgson and V. Perry, filed May 14, 1991 (Ser. No. 07/699,928).

Rate conversion (for example, from the rate of 12 fields per second to the rate of 15 fields per second) is thus achieved by reading out stored fields repeatedly from selected ones of stores 120-127. In one embodiment, data are read from field stores 120-127 at a rate of 60 fields per second (30 fps), and processed in circuit 129, written into circuit 130, and read out from circuit 130 at that rate (30 fps). In another embodiment, data are read from field stores 120-127 at a rate of 15 fields per second (7.5 fps), processed in circuit 129 and written into circuit 130 at the rate of 7.5 fps, but read out from circuit 130 at the rate of 30 fps.

The digital video data stream asserted at the output of circuit 129 includes "artificial" frames comprising even and odd fields from different input frames). Such artificial frames may interfere with subsequent processing of each digital video signal output from processor 74.

Digital data streams A and B from field stores 120-127 are supplied to the two inputs of "mixing and effects" circuit 129. The mix source of circuit 129 may be a constant value (to achieve a "fade" between sources A and B). Circuit 129 preferably has an onboard wipe generation circuit, and means for generating a composite video signal from data streams A and B for display as a split screen image in which a portion of the "A" image, and a complementary portion of the "B" image, occupy distinct regions of a monitor screen. The wipe generator means within circuit 129 generates rectangular wipes of any size within the output raster, may be switched on or off at any time in response to control signals from processor 76, and preferably inserts a border signal into the data stream in order to produce a distinctive displayed border which separates the two image regions of the displayed composite signal. Such a distinctive border helps the system user to distinguish a reference image from a test image, since often the test image differs only slightly and subtly from the reference image.

Circuit 129 preferably also includes means for inserting a conventional graphics cursor signal into the composite video digital signal produced by other circuitry within circuit 129. The cursor signal overlays a cursor region of the displayed video output from output processor 74. By operating the input device 28 to change the cursor signal, the user controls the position of the cursor in the displayed video image. In a preferred embodiment, when the displayed cursor highlights a region of a displayed video frame, the user can select color coefficients and parameters to match the highlighted region by entering appropriate commands using the input device 28.

The 8-bit parallel data streams (one 8-bit parallel stream for each of the R,G,B color channels) asserted at the output of circuit 129 are supplied to intermediate frame store circuit 130. The digital data from circuit 129 are written into circuit 130 at a first rate (typically 15 fields per second, which is 7.5 frames per second) and are read out from circuit 130 at four times the first rate (typically, 60 fields per second or 30 frames per second, the proposed standard SMPTE-240M digital video frame rate). Each bit written into circuit 130 is thus read out four times from circuit 130.

Within coding circuit 140, video synchronization signal insertion circuitry inserts conventional digital blanking, sync, and vertical interval data into the horizontal and vertical blanking intervals of the digital data read out from circuit 130. The output of circuit 140 is thus a digital video signal ready for display. Preferably, the inserted sync information is standard high definition digital video sync information (for example, it may satisfy the proposed SMPTE-240M high definition digital video standard), so that the output of circuit 140 is a standard high definition digital color video signal. The sync information is supplied to circuit 140 from an internal timing generator 182 within timing unit 190, which is in turn within control processor 76 (to be described below).

Preferably, coder 140 also inserts encoded "tagging" information into the video signal emerging from circuit 130. The tagging information can be a set of color correction or noise reduction parameters useful for performing subsequent color correction or noise reduction processing, or information which identifies artificial frames generated during the 3-2 pulldown process. Identification of the artificial frames in this manner enables subsequent processing systems (such as an EBR system which converts video signals to motion picture film images) to reject (or specially process) the artificial frames from the output of the FIG. 1 system.

The output of coder 140 is an 8-bit color digital video signal. Coder 140 asserts alternate frames of this digital video signal on output lines C and D, for storage, respectively, in frame stores 30 and 31 (shown in FIG. 1).

Figure 8:
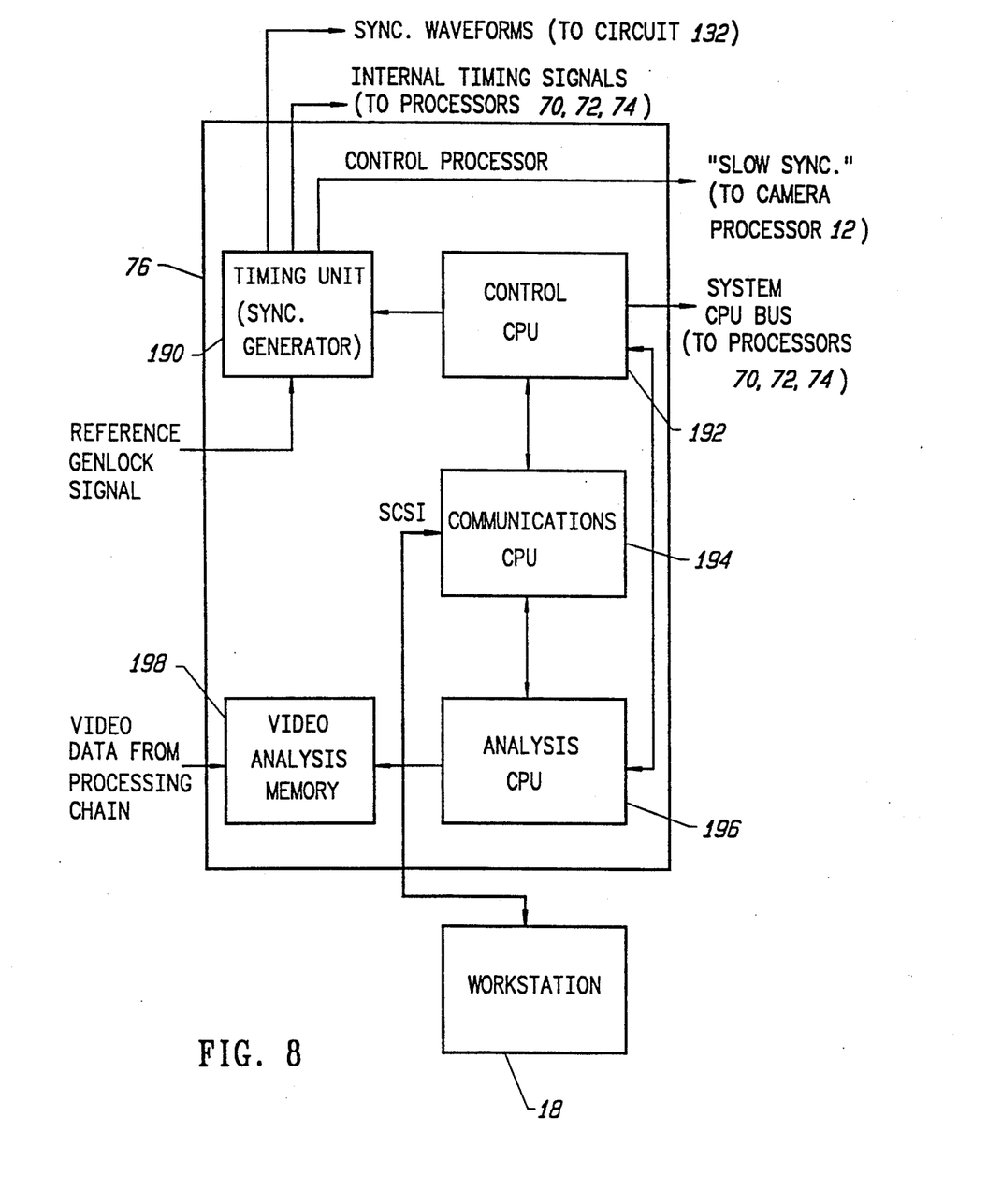
FIG. 8 is block diagram of the control processor shown in FIG. 2.

Control processor 76 of film scanning processor 14 will next be described with reference to FIG. 8. Communications CPU 194 within control processor 76 communicates with computer 18 over an SCSI interface.

The digital data being processed within film scanning processor 14 are supplied to video analysis memory 198. In response to instructions from CPU 194, a data analysis CPU 196 reads data from memory 198, analyzes the data, and sends the analysis results to CPU 194, which relays the results to computer 18.

In response to commands from CPU 194, control CPU 192 sends control signals to timing unit 190, and to the other processing boards within the film scanning processor 14 (input processor 70, digital signal processor 72, and output processor 74).

Figure 9:
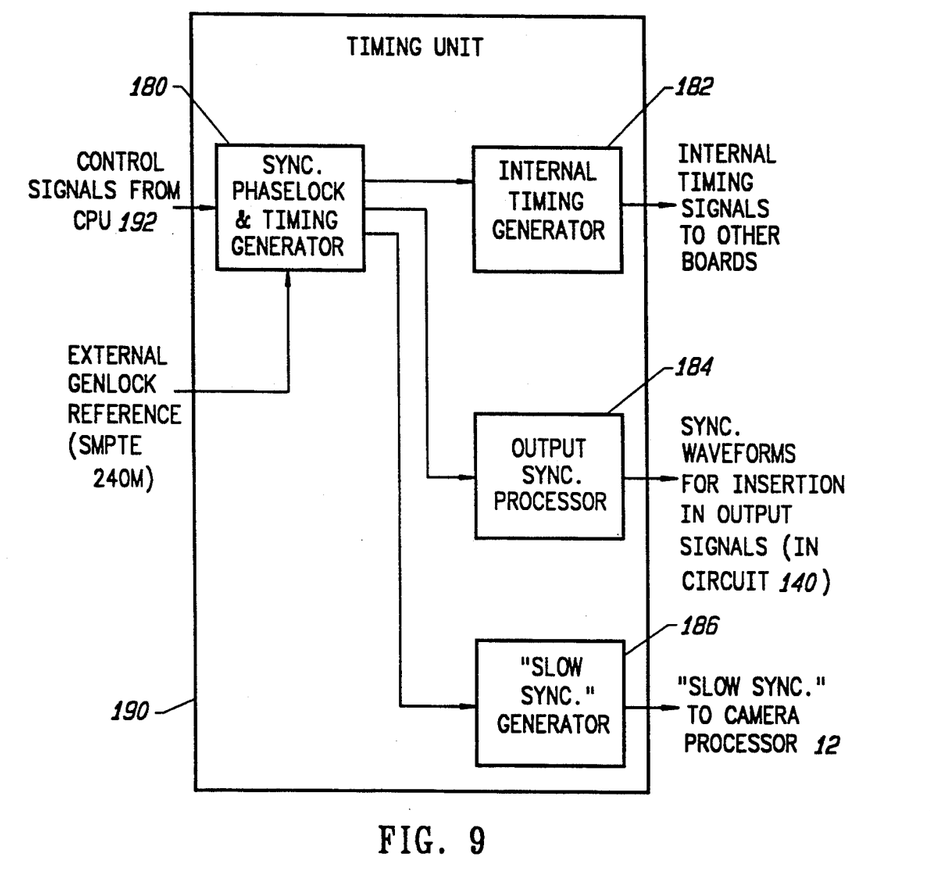
FIG. 9 is block diagram of the timing unit shown in FIG. 8.

With reference to FIG. 9, sync phaselock and timing generator 180 within timing unit 190 receives an external genlock reference signal (preferably an SMPTE-240M genlock reference signal), so that all signals supplied from circuit 180 to the other components of timing unit 190 are phaselocked to the external genlock reference. Slow sync generator 186 generates the above-mentioned low rate synchronization signal ("slow sync") for use by camera processor 12 in response to control signals from CPU 192. Output sync processor 184 generates synchronization waveforms for insertion in circuit 140 into the digital video data stream as described above, in response to control signals from CPU 192. Internal timing generator 182 generates other timing signals for use by processors 70, 72, and 74, in response to control signals from CPU 192.

Various other modifications and alterations in the structure and method of operation of this invention will be apparent to those skilled in the art without departing from the scope and spirit of this invention. Although the invention has been described in connection with specific preferred embodiments, it should be understood that the invention as claimed should not be unduly limited to such specific embodiments.

What is claimed is:
1. A film scanning system, including:
means for generating a digital signal having a first slow frame rate and representing digitized film images; and
means for digitally correcting the digital signal at a second slow frame rate to generate a corrected digital signal, wherein each of the first slow frame rate and the second slow frame rate is less than a standard frame rate, wherein the corrected digital signal consists of bits representing image fields, wherein the first slow frame rate is equal to 24/N frames per second, where N is a positive integer, and the second slow frame rate is equal to 96/N frames per second;

means for generating a video signal having said standard frame rate from the corrected digital signal, wherein the means for generating a video signal includes:

a set of field stores, each for receiving and storing at least some of the bits of the corrected digital signal;

means for reading fields of the stored corrected digital signal from the field stores and performing a 3-2 pulldown operation on said fields to generate a third digital signal having a third slow frame rate; and digital sync insertion means for converting the third digital signal into a composite video signal.

2. The system of claim 1, wherein the third slow frame rate substantially equal to one fourth the standard frame rate.

3. The system of claim 1, wherein the first slow frame rate is substantially equal to 1.5 frames per second, the second slow frame rate is substantially equal to 6.0 frames per second, and the third slow frame rate is substantially equal to 7.5 frames per second.

4. The system of claim 1, wherein the composite video signal is an SMPTE-240 high definition video signal.

5. A film scanning system, including:

means for generating a digital signal having a first slow frame rate and representing digitized film images;

first buffer means for storing the digital signal;

means for writing the digital signal into the first buffer means at the first slow frame rate;

means for reading the digital signal from the first buffer means, in parallel form, at the second slow frame rate; and means for digitally correcting the digital signal read from the first buffer means at the second slow frame rate to generate a corrected digital signal, wherein the second slow frame rate is four times the first slow frame rate, wherein the digital signal consists of bits, wherein the means for writing the digital signal writes the bits serially into the first buffer means, and wherein the means for reading the digital signal reads each of the bits four times from the first buffer means.

6. The system of claim 5, wherein the digital signal represents digitized color film images and consists of red bits, blue bits, and green bits, wherein the first buffer means includes a first pair of double buffers for storing the red bits, a second pair of double buffers for storing the blue bits, and a third pair of double buffers for storing the green bits.

7. A film scanning system, including:

means for generating a digital signal having a first slow frame rate and representing digitized film images;

first buffer means for storing the digital signal;

means for writing the digital signal into the first buffer means at the first slow frame rate;

means for reading the digital from the first buffer means, in parallel form, at the second slow frame rate; and means for digitally correcting the digital signal read from the first buffer means at the second slow frame rate to generate a corrected digital signal, wherein the corrected digital signal consists of bits representing image fields;

a set of field stores, each for receiving and storing at least some of the bits of the corrected digital signal;

means for reading fields of the stored corrected digital signal from the field stores to generate a third digital signal having a third slow frame rate;

second buffer means for storing the third digital signal;

means for writing the third digital signal into the second buffer means at the third slow frame rate;

means for reading the third digital signal from the second buffer means at a standard frame rate to generate a fourth digital signal having the standard frame rate; and means for generating a video signal having the standard frame rate from the fourth digital signal.

8. The system of claim 7, wherein the video signal is an SMPTE-240 high definition video signal.

9. The system of claim 7, wherein the means for generating a digital signal includes:

means for scanning film to generate an analog signal representing scanned color film images, wherein the analog signal has the first slow frame rate; and analog-to-digital conversion means for generating the digital signal from the analog signal.

10. A film scanning system, including:

means for generating a digital signal having a first slow frame rate and representing digitized film images; and means for digitally correcting the digital signal at a second slow frame rate to generate a corrected digital signal, wherein the first slow frame rate is substantially equal to 1.875 frames per second, and the second slow frame rate is substantially equal to 7.5 frames per second.

11. A film scanning method, including the steps of:

generating a digital signal having a first slow frame rate and representing digitized film images;

digitally correcting the digital signal at a second slow frame rate to generate a corrected digital signal; and generating a video signal having a standard frame rate from the corrected digital signal, wherein the corrected digital signal consists of bits representing image fields, and the step of generating the video signal includes the steps of:

performing a 3-2 pulldown operation on the fields of the corrected digital signal to generate a third digital signal having a third slow frame rate; and converting the third digital signal into the video signal.

12. The method of claim 11, wherein the third slow frame rate substantially equal to one fourth the standard frame rate.

13. The method of claim 11, wherein the first slow frame rate is substantially equal to 1.5 frames per second, the second slow frame rate is substantially equal to 6.0 frames per second, and the third slow frame rate is substantially equal to 7.5 frames per second.

14. The method of claim 11, wherein the video signal is an SMPTE-240 high definition video signal.

15. The method of claim 11, wherein the step of generating a digital signal includes the steps of:

scanning film to generate an analog signal representing scanned color film images, wherein the analog signal has the first slow frame rate; and converting the analog signal into the digital signal.

16. A film scanning method, including the steps of:

generating a digital signal having a first slow frame rate and representing digitized film images;

digitally correcting the digital signal at a second slow frame rate to generate a corrected digital signal; and generating a video signal having a standard frame rate from the corrected digital signal, wherein the corrected digital signal consists of bits representing image fields;

storing at least some of the bits of the corrected digital signal in each of a set of field stores;

reading fields of the stored corrected digital signal from the field stores to generate a third digital signal having a third slow frame rate;

writing the third digital signal into the second buffer means at the third slow frame rate;

reading the third digital signal from the second buffer means at a standard frame rate to generate a fourth digital signal having the standard frame rate; and generating a video signal having the standard frame rate from the fourth digital signal.

17. The method of claim 16, wherein the video signal is an SMPTE-240 high definition video signal.

18. A film scanning method, including the steps of:

generating a digital signal having a first slow frame rate and representing digitized film images;

writing the digital signal into a first buffer means at the first slow frame rate;

reading the digital signal from the first buffer means, in parallel form, at the second slow frame rate, wherein the second slow frame rate is four times the first slow frame rate, wherein the digital signal consists of bits, wherein the bits are serially written into the first buffer means, and wherein each of the bits is read four times from the first buffer means; and digitally correcting the digital signal read from the first buffer means at the second slow frame rate to generate a corrected digital signal.

19. A film scanning method, including the steps of:

generating a digital signal having a first slow frame rate and representing digitized film images; and writing the digital signal into a first buffer means at the first slow frame rate, wherein the first slow frame rate is substantially equal to 1.875 frames per second, and the second slow frame rate is substantially equal to 7.5 frames per second.

* * * * *